Dec. 4, 1956 J. M. CHRISTMAN 2,772,602
APPARATUS FOR MANUFACTURING SPIRAL BEVEL AND HYPOID GEARS
Filed March 30, 1951 6 Sheets-Sheet 1

INVENTOR.
JOHN M. CHRISTMAN

BY

ATTORNEY

Dec. 4, 1956     J. M. CHRISTMAN     2,772,602
APPARATUS FOR MANUFACTURING SPIRAL BEVEL AND HYPOID GEARS
Filed March 30, 1951     6 Sheets-Sheet 2
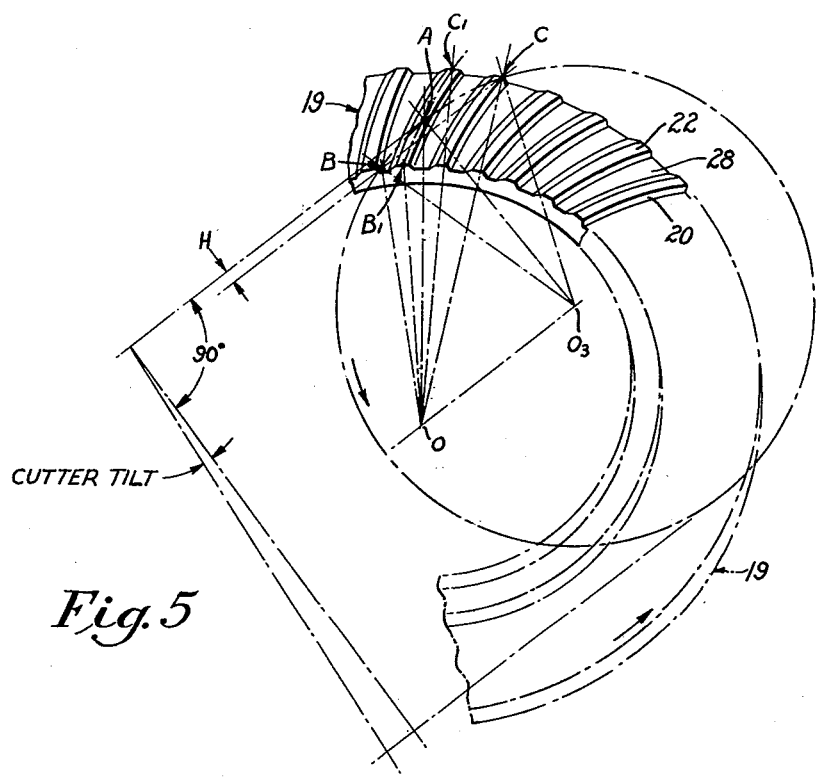
Fig. 5
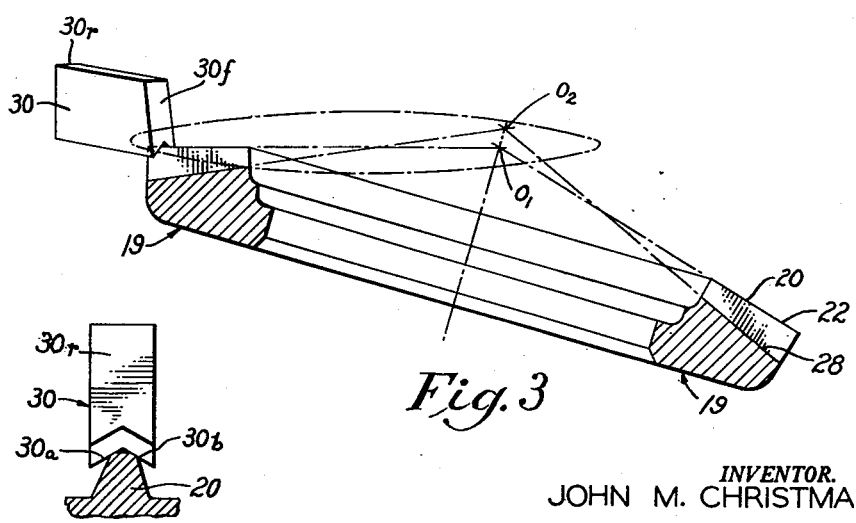
Fig. 3
Fig. 4
INVENTOR.
JOHN M. CHRISTMAN
BY Gregory S. Dolgorukov
ATTORNEY Dec. 4, 1956   J. M. CHRISTMAN   2,772,602
APPARATUS FOR MANUFACTURING SPIRAL BEVEL AND HYPOID GEARS
Filed March 30, 1951   6 Sheets-Sheet 3

INVENTOR.
JOHN M. CHRISTMAN
BY Gregory S. Dolgorukov
ATTORNEY

Dec. 4, 1956 J. M. CHRISTMAN 2,772,602
APPARATUS FOR MANUFACTURING SPIRAL BEVEL AND HYPOID GEARS
Filed March 30, 1951 6 Sheets-Sheet 6

INVENTOR.
JOHN M. CHRISTMAN
BY
Gregory S. Dolgorukov
ATTORNEY

2,772,602

APPARATUS FOR MANUFACTURING SPIRAL BEVEL AND HYPOID GEARS

John M. Christman, Grosse Pointe Woods, Mich.

Application March 30, 1951, Serial No. 218,488

11 Claims. (Cl. 90—1.4)

This invention relates to gears and more particularly to an improved apparatus for chamfering top edges of gear teeth, particularly in bevel gears, spiral bevel gears, and hypoid gears.

Referring particularly to chamfering of the top edges of the gear teeth along their working faces, it has been well appreciated in the art that presence of a hard sharp tooth edge, often with a burr, is very undesirable and may result in a premature failure of the gear. Prior to hardening and while the gear is still relatively soft, such sharp edge may be easily nicked in handling. Unless the nick is removed prior to hardening it may produce a very hard raised spot which will cause excessive local wear of the working faces of the mating teeth, and will produce various difficulties, making the gear unusable. It should also be appreciated in this connection that presence of a burr along the edges of a gear tooth is equally undesirable, since in hardening or quenching such burr, unless burned completely in prior heating, cools much faster than the faces of the tooth and may be much harder after the heat treatment than the working faces of the teeth. Therefore when such burr or small particles of hard brittle metal separating therefrom are pressed against the working surfaces of the gear teeth, damage may be done to their usually careful finish. As a result, operation of the gear and its life may be seriously affected. The above considerations apply with an equal force to sharp edges even if no burr is present. Such sharp edges have an additional disadvantage of presenting the danger of chipping off under heavy loads, when broken pieces of hard metal may get between the teeth of the gears and do further damage. The difficulties explained above are particularly serious in automobile gears which usually transmit higher torques and operate at higher speeds than gears in other types of installations.

While the above consequences have been fully appreciated in the art, in cases of automobile gears of the spiral bevel and hypoid types, such consequences have been considered unavoidable, and chamfering teeth of such gears along their top edges has not heretofore been done in quantity production. It should be appreciated that the edge of a tooth of a gear of this general type is a curved line and therefore guiding a suitable cutter along the required curvilinear path presents a problem similar to generation of the curvilinear path of the cutter in cutting the tooth itself, thus requiring the use of heavy and complicated machines such as are used in cutting such gears. However, the use of such machines is also not practical, since such machines are designed for rather heavy and slow cutting and are too expensive to operate for such a relatively light cutting as chamfering. In addition, such machines are designed to produce teeth which are higher at the outer periphery of a gear than at the inner side thereof, and thus guide the cutter along a different path than is required for chamfering the teeth. If tooth cutting and chamfering were done in the same operation, guiding the chamfering portion of the cutter along the same path as its tooth cutting portion would result in producing a very heavy chamfer at the outer end of the tooth and insufficient chamfer or no chamfer at all at the inner end thereof. On the other hand, removing burrs, nicks, or sharp edges of gear teeth by hand is a slow, tedious and costly operation, totally impracticable under the actual conditions of automobile manufacturing.

One of the objects of the present invention is to provide an improved method and an apparatus whereby the above difficulties and disadvantages are overcome and largely eliminated, and whereby teeth of spiral bevel and hypoid gears may be chamfered rapidly and inexpensively in a desired manner, producing gears which can be lapped more rapidly and with less scrap, which are less likely to fail under heavy loads, which retain their finish for a longer period of time and therefore run smoother, more quietly, have higher mechanical efficiency and longer life.

Another object of the invention is to provide an improved method and an apparatus for chamfering top edges of teeth on spiral bevel and hypoid gears whereby there is produced on such teeth a chamfer of a desired contour, such, for instance, as a chamfer which is equal on both sides of a tooth and is uniform along the entire face thereof.

A further object of the present invention is to provide an improved method and an apparatus for chamfering top edges of teeth of bevel gears, spiral bevel and hypoid gears whereby such chamfering is done very rapidly, such as at a rate of 10–25 teeth per second (i. e. nearly 20 times as fast as could be done with the use of apparatus used for cutting such gears) and yet without speeding up the machine to a point where it has to be designed and built as a high speed machine with its rotating parts properly balanced statically and dynamically to prevent excessive vibration and similar difficulties encountered in high speed operations, particularly in machines of this general nature requiring indexing of heavy masses.

A still further object of the present invention is to provide an improved method for chamfering teeth of spiral bevel or hypoid gears, which can be carried out with the aid of extremely simple and inexpensive "special" machine, i. e. a machine designed for gears of one definite dimensional specification which method is also susceptible of being carried out in a more elaborate "universal" machine, i. e. a machine which can be set up for chambering gears of such general nature of many different dimensional specifications or designs.

A still further object of the present invention is to provide an improved method and an apparatus for chamfering top edges of teeth on spiral bevel and hypoid gears, whereby two edges are chamfered simultaneously by the same cutter, thus producing balanced application of side forces on the cutter and on the chamfered tooth.

A still further object of the present invention is to provide an improved method and an apparatus for chamfering top edges of teeth on spiral bevel and hypoid gears, whereby in chamfering such teeth at least one cutter tooth is always in working contact with a gear tooth, i. e. in which a cutter tooth retains its working contact with the chamfered gear tooth until the next cutter tooth establishes full working contact with the next gear tooth.

A still further object of the present invention is to provide an improved apparatus for chamfering top edges of teeth on bevel gears, spiral bevel gears, and hypoid gears, which can be operated with success by unskilled labor and which requires performance by its operator of only a few simple operations easily learned in a matter of less than an hour.

It is an added object of the present invention to provide an improved apparatus or machine of the foregoing nature, which is simple in construction, dependable in operation, and is relatively inexpensive to manufacture.

Further objects and advantages of the invention will be apparent from the following description, taken in connection with the appended drawings, in which:

Fig. 3 is a diagrammatic elevational view, partly in section, illustrating engagement of the cutter teeth with the gear teeth.

Fig. 4 is an end view, partly in section, illustrating engagement of one gear tooth by the straddling cutter tooth for chamfering both edges thereof simultaneously.

Fig. 5 is an exemplary layout illustrating the method of designing the cutter for proper operation and for engaging gear teeth without interference.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
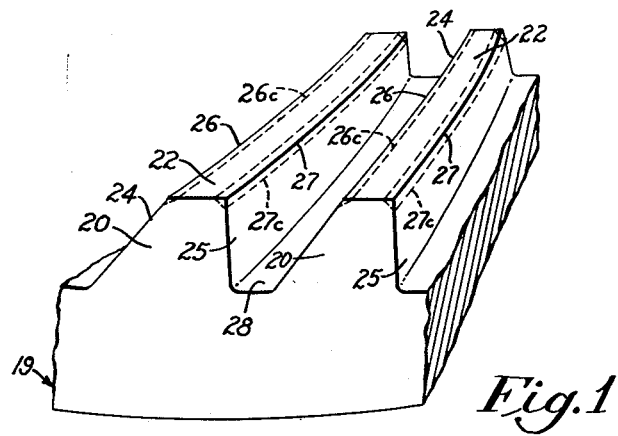
Fig. 1 is a fragmentary view showing two teeth of a hypoid gear, with the chamfer along the top edges thereof indicated in dotted lines.

In accordance with the invention I effect chamfering of the top edges of teeth of spiral bevel and hypoid gears such as shown in Fig. 1, using a cutter having a number of chamfering teeth and designed, in effect, as a gear adapted to mesh with the gear to be chamfered and to rotate therewith without interference between the teeth of the gear to be chamfered and the teeth of the cutter, with the engagement of the gear and cutter being tooth per tooth, i. e. one tooth of the cutter engaging one tooth of the gear. It is preferable to have cutter teeth so arranged that before one cutter tooth loses contact with its meshing gear tooth, the next cutter tooth establishes contact with the next tooth of the gear, thus effecting "overlapping" contact of the gear and cutter teeth. It will be understood, however, that such overlapping is not necessary when gear and cutter are driven in positive timed relation.

Figure 13:
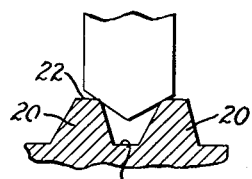
Fig. 13 is an end view similar in part to Fig. 4 but showing a modified construction of a cutter tooth, namely a chamfering tooth of the wedge type.

The axis of rotation of the cutter is so arranged with respect to the axis of the gear that the teeth of the cutter move with respect to the gear teeth to produce the desired chamfer. The cutter teeth are designed to chamfer simultaneously two tooth edges. A straddling chamfering cutter cuts two edges of the same tooth, as shown in Fig. 4, while a wedge type chamfering cutter cuts the edges of the two adjacent teeth, as shown in Fig. 13. Either type of cutter can be used. However, while a tooth of a straddling cutter is caused to move substantially parallel to the edges to be chamfered if a uniform chamfer is desired, a wedge type cutter is caused to move at an angle thereto to compensate for divergency of edges of the adjacent teeth in gears with varying height of the tooth.

Machines constructed in accordance with the present invention and including chamfering cutters of the above nature may be designed to have the axes of the gear and cutter extending vertically, with cutter above or below the gear, or horizontally.

In a simple form of the machine, only the cutter may be power-rotated, while the gear is freely rotatable on its spindle and is rotated by the cutter, which in such a case becomes both the cutter and the driving gear.

Another form of the machine may have the gear driven by power means in a speed (angular) ratio equal to the teeth ratio of the cutter and the gear. With such a construction, the gear to be chamfered is locked on its spindle which is positively connected to the cutter for rotation. Locating means may be provided on the gear spindle to insure proper positioning of the gear teeth with respect to the teeth of the cutter.

Machines of the above nature may be made special or universal, i. e. they may be designed for chamfering gears of one dimensional specification, or may be designed to permit various adjustments in the positioning of the gear and the cutter to permit chamfering, with the use of appropriate cutters, gears of various dimensional specifications.

Feeding means, i. e. the means bringing the gear and the cutter into operative engagement may be of any suitable type, such as mechanical or hydraulic.

By providing required relative tilt between the axes of cutter and the gear, a uniform chamfer, or varying chamfer such as for instance a heavier chamfer at the bigger end of the tooth of varying height, may be produced.

Referring to the drawings, Fig. 1 illustrates a portion of an automobile ring gear 19 of the hypoid type having teeth 20, each having a top surface 22 constituting portions of the cone surface having its apex disposed on the axis of the gear. The side or working faces 24 and 25 are formed in accordance with the design of the tooth, and their intersection with the top surfaces 22 produces sharp edges 26 and 27. In the gear illustrated in the drawing, the edges 26 and 27 of the same tooth are substantially parallel, but the neighboring edges of the adjacent teeth are diverging toward the outer periphery of the teeth due to the fact that the teeth are higher at the outer periphery of the gear, and therefore the root surfaces 28 form an angle with the top surfaces 22. In the gear illustrated it is desired to chamfer the sharp edges 26 and 27 to produce a uniform chamfer 26c and 27c along the faces of the teeth, and the machines may be set to produce such chamfer constructed in accordance with the invention, or any desired deviation therefrom.

Figure 2:
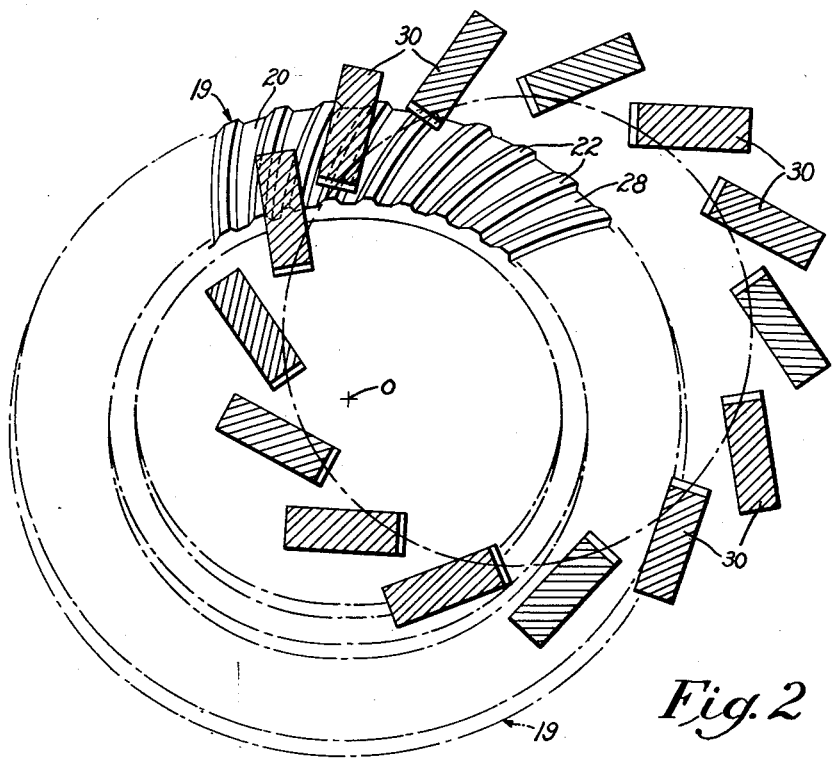
Fig. 2 is a diagrammatic plan view illustrating engagement of the cutter teeth with the teeth of the gear in chamfering the same.

Figs. 2–4 illustrate in a plan view the operative engagement of the cutter with the gear 19. As can be seen from an examination of said figures, the cutter teeth 30 are recessed to provide on each cutter tooth cutting lips 30a and 30b adapted to take a chamfering cut along the edges 26 and 27 when the cutter tooth 30 straddles the gear tooth 20, as is best shown in Figs. 3 and 4.

The number of teeth on the cutter and the resulting diameter of the cutter are usually selected so at least one cutter tooth is in contact with one tooth of the gear, or in other words before a cutter tooth loses contact with the gear tooth which it is chamfering, the next cutter tooth establishes cutting contact with the next gear tooth. (Such overlapping contact is not necessary when gear and cutter are driven in positive time relation, as mentioned.) Such a construction is best shown in Fig. 2.

While the cutter teeth need not be long, I prefer to make them of a considerable length from their front or rake surface $30f$ in order to permit repeated grinding of such teeth. It should be appreciated in this connection that due to the fact that cutter teeth 30 are disposed above the gear and enter the space between the adjacent gear teeth only for small distance, the rear portions $30r$ of the teeth 30 do not interfere with the teeth 20 of the gear.

As can be best seen in Fig. 3, the chamfering cutter teeth 30 move along the top edges of the gear teeth 20 substantially parallel to the cone surface forming the top surfaces of the teeth and having apex at point $O_1$, rather than parallel to the cone surface forming the root surfaces 28 and having its apex at point $O_2$. By virtue of such movement uniform chamfer is produced.

Fig. 5 gives a plan of an exemplary layout by which the cutter is designed to give proper operation. The cutter is designed for a gear of one dimensional specification. Presuming, for the sake of example, that the gear to be chamfered has certain diameter properly represented on the layout and has 41 teeth, a trial radius of the cutter, preferably somewhat smaller than that of the gear is first assumed, and a desired number of teeth for the cutter is established. Suppose that 14 teeth have been prescribed for the cutter, giving 14/41 teeth ratio. Points B and C are thereupon established from the trial cutter radius that passes through the point A on the gear tooth. It can now be seen that when the cutter rotates from the point A to the point C, the gear should rotate 14/41 of this amount, and the point $C_1$ of the gear moves to the position at C. In other words, as the cutter rotates through the angle A—$O_3$—C, the gear should rotate through the angle $C_1$—O—C. Also as the cutter rotates from the point A to point B, or through the angle A—$O_3$—B, the gear should rotate 14/41 of this amount, and point $B_1$ on the gear should come to the position at B. With such rotation of the gear and the cutter, a tooth provided on the cutter will move along the edge of the gear tooth without interference or jamming in.

The points A, B, C and the cutter radius usually are established several times before the above requirements are fulfilled. In designing a cutter for a machine in which the spindle of the cutter and the spindle of the gear are positively connected to rotate in a predetermined ratio of angular speeds, the cutter radius can be established more accurately and in less time.

Since points A, B, and C lie on the conical surface which is curved, it is necessary to tilt the cutter to make the plane thereof substantially coincide with all of said three points and, consequently, with the portion of the cone surface in which said points are located. This tilt is best shown in Fig. 3, wherein the circular plane of the cutter is shown angularly offset and appearing as an ellipse. In Fig. 5, the amount that point A is higher than points B and C divided by the height of the arc H between them equal the tangent of the cutter tilt angle.

Figure 6:
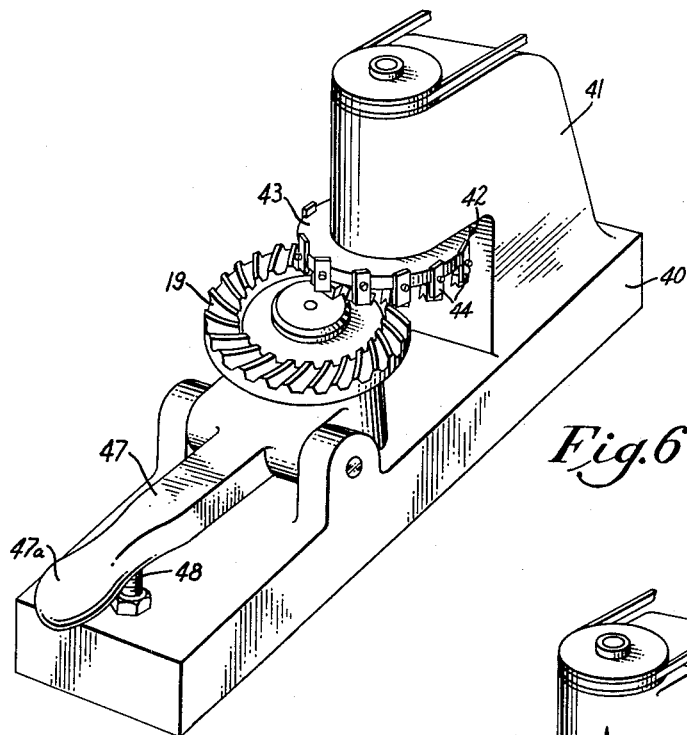
Fig. 6 is a perspective view of one machine embodying the invention and adapted for chamfering spiral bevel and hypoid gears of one dimensional specification, rotation of the gear being effected by the cutter itself.

Fig. 6 illustrates one machine for chamfering top edges of teeth of spiral bevel and hypoid gears, in which the cutter operates also as a driving gear rotating the gear to be chamfered in the process of chamfering the same. The gear to be chamfered is mounted on a work spindle to rotate freely thereon, or therewith. The machine is of the "special machine" type, i. e. is designed for chamfering gears of one dimensional specification, and has no provisions for adjusting the relative positions of the axes of the gear spindle and of the cutter spindle.

The machine comprises a base 40 having an arm 41 in which there is operatively mounted for rotation a chamfering cutter generally designated by the numeral 42. The cutter comprises a hub 43 having insertable chamfering teeth 44 of the type adapted to straddle teeth 20 of a gear 19. The gear 19 is mounted on a freely rotating spindle journalled in anti-friction bearings of any suitable type, such as ball bearings, and carried by the lever 47 hingedly mounted on the base 40. When the handle $47a$ of the lever is held down against the adjustable stop 48, the gear 19 is brought into the desired uppermost position at which the gear is in cutting engagement with the cutter for the desired depth of chamfer.

In operation, the gear is loaded into the machine with the lever handle $47a$ all the way up, and the gear spindle is thus brought into its lowermost position. After the gear is put in place, the handle 47 is pressed down, while the gear 19 is manipulated by hand to bring its teeth into the engagement with the teeth of the cutter. After the gear is thus engaged by the cutter, the machine is started, preferably gradually, particularly when the gear is heavy or has relatively large diameter and, consequently, high inertia. Straddling cutter teeth cause the gear to rotate, bringing the gear teeth one by one under the cutter. After all teeth are thus chamfered, one or more revolutions of the gear may be permitted to effect finishing cuts, whereupon the machine is stopped and unloaded. Rotation of the cutter may be effected by power means, as shown, or a suitable handle may be provided for hand rotation of the cutter. It will be understood that with the above construction, the overlapping contact of the cutter and gear teeth is necessary.

Figure 7:
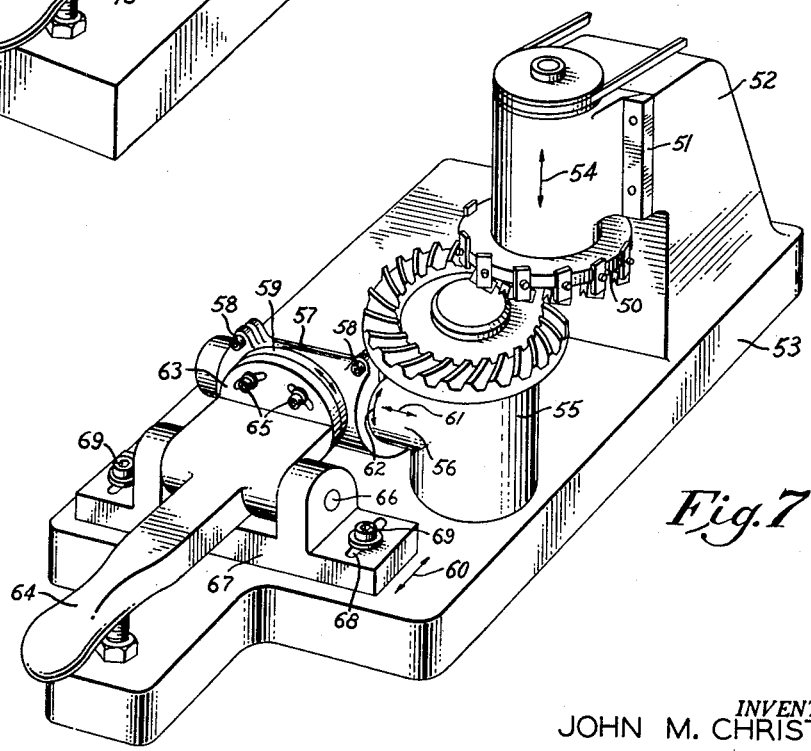
Fig. 7 is a perspective view of a machine similar in part to the machine of Fig. 6 but universal in character, i. e. designed to permit adjustments necessary for chamfering spiral bevel and hypoid gears of various dimensional specifications.

Fig. 7 illustrates a machine similar in part to the machine shown in Fig. 6 but having means whereby the machine can be adjusted for chamfering teeth of spiral bevel and hypoid gears of various dimensional specifications. For the latter reason this machine may be termed "universal machine." In the machine of Fig. 7 rotation of the gear to be chamfered is effected also by the cutter itself in the process of chamfering of the gear.

Means effecting desired adjustments are provided in mounting of the cutter as well as in mounting of the gear spindle. As can be seen from an examination of the drawing, the cutter 50 is mounted in a vertical dovetail slide 51 provided in the arm 52 of the base 53. By virtue of such a construction, the cutter may be raised or lowered as indicated by the arrow 54, and fixed in a desired position without affecting its rotation.

The spindle carrying the gear 19 is mounted in suitable anti-friction bearing in a hub 55 having a cylindrical extension 56 held in a partially split collar 57. Screws 58 are provided to tighten and to loosen the collar 57 and thus to permit moving the hub 55 bodily transversely of the machine as indicated with the aid of an arrow 61, and to turn it for a desired angle in a vertical plane longitudinally of the machine as indicated with the aid of an arrow 62, and to fix the hub 55 in a desired position therein. The collar 57 has a flange 59 provided thereon and cooperating with a flange 63 provided on the lever 64. Screws 65 or similar means, enable tightening the flanges 59 and 63 rotating around a common axis, and thus adjusting the axis of the gear spindle in a vertical plane transversely of the machine. The lever 64 is hinged as shown at 66 in a bracket 67 provided with slots 68 and held to the machine base 53 with the aid of screws 69 or similar means, whereby moving the bracket and adjusting it longitudinally of the machine, as indicated by arrows 60, is made possible.

By virtue of the above described construction the gear spindle may be moved bodily in two mutually perpendicular directions, and therefore may be brought into any desired point within the limits of the bodily adjustments. Moreover, said spindle may be angularly adjusted in two mutually perpendicular planes, and therefore it may be brought into any desired angular position with respect to the cutter spindle. With the cutter also movable up and down the machine can be adjusted to accommodate gears of any practical diameter, cone angle, thickness, and other dimensional characteristics.

Figure 8:
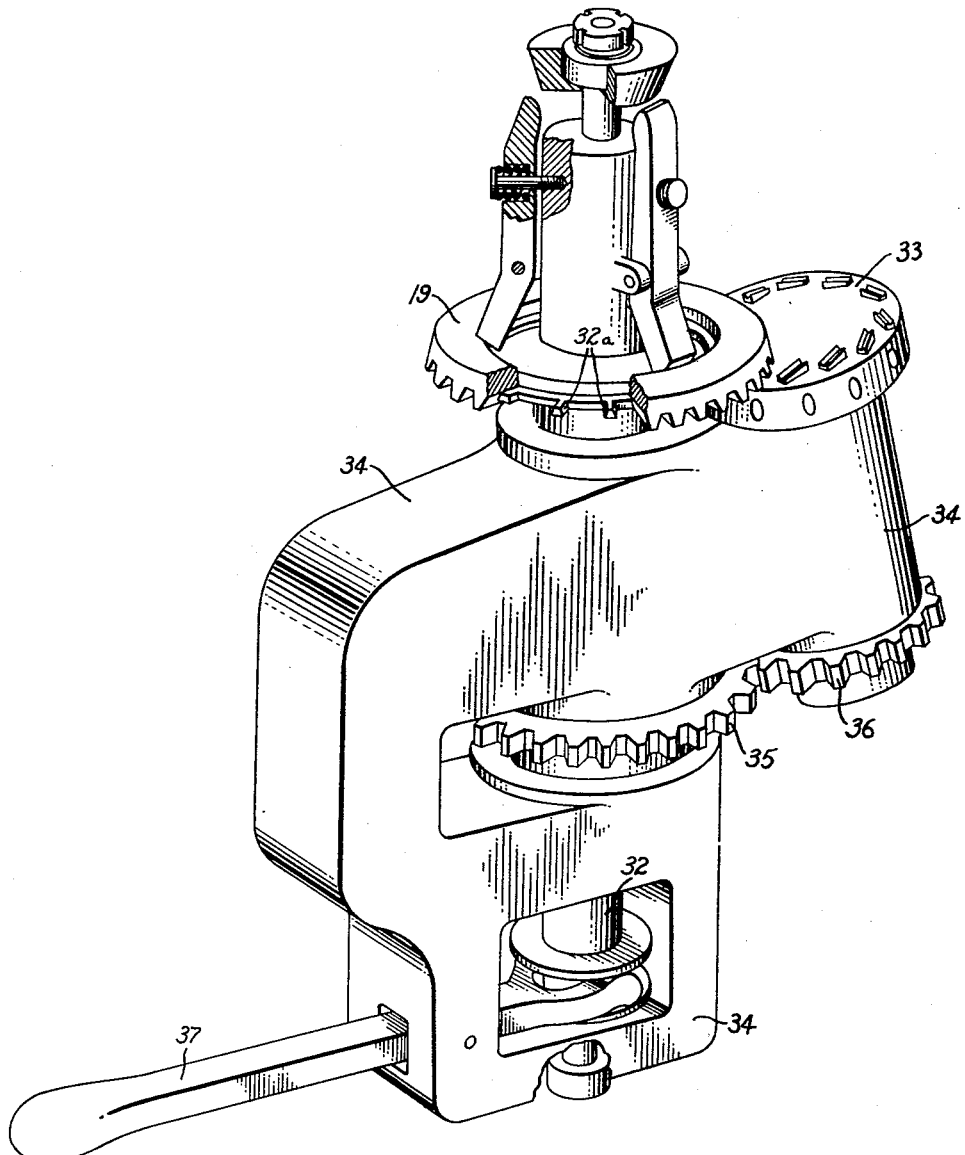
Fig. 8 is a perspective view of a machine similar in part to the machine of Fig. 6 but having power means for driving or rotating both the gear and the cutter in a predetermined ratio of angular speeds.

Fig. 8 illustrates a special machine, i. e. one designed for chamfering gears of one definite dimensional specification, and having a positive driving connection between the work (gear) spindle and the cutter spindle. Accordingly, in this machine the work spindle 32 and the spindle of the cutter 33 are mounted in the frame 34 in certain permanent relative positions as determined by the design of the gear to be chamfered and the design of the cutter. The driving connection between the spindles is effected with the aid of gears 35 and 36 having the same gear ratio as the gear 19 and the cutter 33. Such ratio may be attained by using gears having the same number of teeth as in the gear 19 and the cutter 33. Gear locating spider 32a properly positioned with respect to the cutter teeth is secured on the spindle 32 and is adapted to receive the gear 19. A gear locking mechanism is provided to hold the gear 19 in place. A handle 37 is adapted to unlock the locking mechanism and to bring the gear 19 into and out of the cutting engagement with the cutter 33. It should be noted, that the gears 35 and 36 are bevel gears, although their bevel characteristics are slight and not immediately apparent from the drawing.

Figure 9:
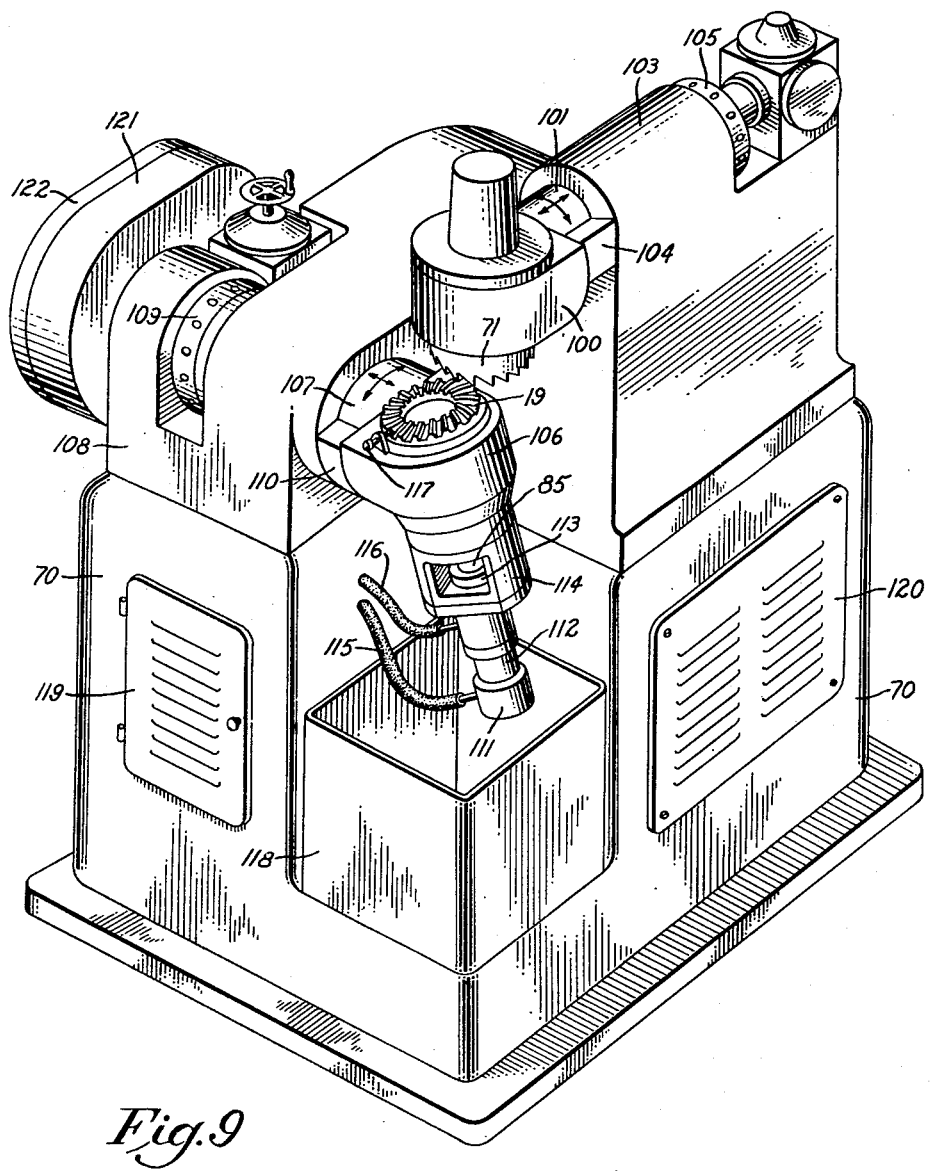
Fig. 9 is a perspective view of a universal machine embodying the present invention and including power means for driving or rotating both the gear and the cutter in a predetermined ratio of angular speeds.
Figure 10:
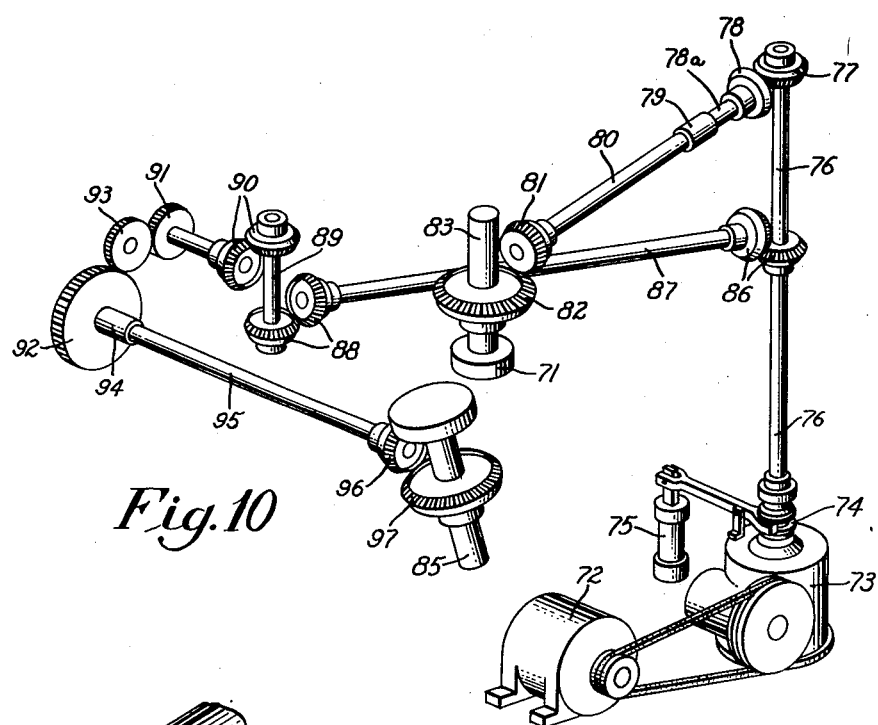
Fig. 10 is a perspective diagrammatic view of the train of driving means positively connecting the gear and the cutter.
Figure 11:
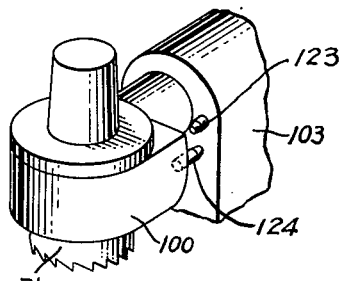
Fig. 11 is a fragmentary perspective view showing the details of construction of the locating means used for setting the cutter spindle in a desired position.

Figs. 9 and 10 illustrate a machine having positive driving connection between the gear to be chamfered and the cutter. This machine is universal in its design, i. e. is provided with means whereby it can be adjusted and set for chamfering spiral bevel and hypoid gears of various dimensional specification. This particular machine is of substantial or heavy duty design, and is intended for large quantity automotive production, being intended to chamfer gears cut by 40–60 gear cutting machines operated at fully capacity.

The machine comprises a frame or frame housing 70 in which there are operatively mounted the elements of the train illustrated diagrammatically in Fig. 10. Referring to said figure, the cutter 71 is driven by the electric motor 72 through a speed reducing device 73 of any suitable character. A clutch 74 operated in any suitable manner, such as with the aid of a hydraulic cylinder means generally designated by the numeral 75, is provided to enable the operator to disconnect the cutter (and the gear to be chamfered) from the motor and thus stop the machine without stopping the motor. The drive shaft 76 has a miter gear 77 provided on its end, which gear meshes with the other miter gear 78 having a tail shaft 78a drivingly connected by means of a telescoping collar 79 with the shaft 80 drivingly connected through a pair of speed reducing bevel gears 81 and 82 with the cutter spindle 83. By virtue of theh provision of the telescoping connection 79 the cutter spindle 83 may be moved for adjustments toward and away from the shaft 76 without affecting the driving connection therewith.

The work spindle 85 is positively connected to the cutter spindle 83 through a train of driving elements, branching off from the shaft 76 and including: miter gears 86, shaft 87, miter gears 88, shaft 89, miter gears 90, driving ratio gears 91 and 92 connected by an idler gear 93, telescoping connection 94, shaft 95, and a pair of speed reducing gears 96 and 97, preferably of the same tooth ratio as in gears 81 and 82.

It will now be seen in view of the foregoing that with miter gears operating only to change the direction of the driving effort but not affecting the driving ratio between the cutter spindle 83 and the work spindle 85, and with the tooth ratios of the speed reducing gears 96—97 and 81—82 being equal, the speed ratio of spindles 83 and 85 is determined by the tooth ratio of gears 91 and 92. If instead of the cutter 71 and the chamfered gear 19 there were mounted on these spindles a pair of meshing gears of the same tooth ratio as in gears 91 and 92, the entire system could be driven without jamming. From a simple mathematical relationship it follows that the speed ratios of the cutter gear and gears 91—92 may be changed in the same proportion without affecting operativeness of the system.

It is preferable to have the number of teeth on the gear 91 the same as on the cutter, and the number of teeth on the gear 92 the same as on the gear to be chamfered. With such a construction, setting the machine is greatly simplified, and possibilities of mistakes virtually eliminated. For instance, if the machine is to be set for chamfering a gear having 41 teeth, a gear 92 with 41 teeth should also be used. Similarly, in changing cutters, when cutter with 14 teeth is used, the gear 91 with 14 teeth should be installed. It is evident that many other gear combinations may also be used to give desired ratios and at the same time to satisfy other requirements that may be present. For instance, it may be found that a 14 tooth gear used in the above example does not have good rolling action and its number of teeth should be increased. Such a situation was found in one specific machine. Accordingly, the gears 96—97 were selected to have 6:1 ratio, and the gears 81—82 to have 4:1 ratio, hence gear 91 came out to have (14 times 6/4) teeth or 21 teeth.

Universal adjustments are made possible in this machine by providing for bodily movements and angular movements of the cutter spindle and the work spindle in two mutually perpendicular planes. Referring to Figs. 9 and 10 it will be understood that shafts 95 and 80 are arranged perpendicularly to each other. Thus their longitudinal movements permitted by the telescoping connections 79 and 94 enable the job setter to adjust the cutter spindle and the gear spindle at any desired bodily offset. Rotation of said spindles around the axes of the shafts 80 and 95, respectively, enables the job setter to give the spindles any tilt relatively to each other.

In order to effect such movements, the cutter spindle 83 is journalled in suitable bearings provided in a housing 100 having a cylindrical extension 101 coaxial with the shaft 80 and supported in a bore provided in a bearing frame 103. The extension 101 may be moved in the bearing frame 103 longitudinally and be rotated therein for adjustments. Securing the housing 100 in an adjusted position is effected with the aid of a locating block 104 and a nut 105 engaging a threaded portion (not shown) of the extension 101. When the spindle 83 is properly adjusted, the block 104 of proper size is placed between the housing 100 and the bearing frame 103, and the nut 105 securely tightened. This locks the housing 100 and consequently the cutter spindle 83 in the adjusted position.

The adjustment means for the work spindle 85 are similar and include a housing 106 having a cylindrical extension 107 coaxial with the shaft 95 and supported in the bore of a bearing frame 108. A nut 109 and a locating block 110 are provided for the purposes of securing the housing 106 and, consequently, the work spindle 85 in adjusted positions.

Figure 12:
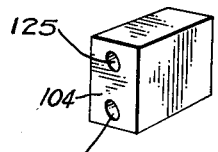
Fig. 12 is a perspective view showing the locating block separately.

When the gears to be chamfered are few in number and are definitely known, means may be provided to enable the job setter to set the machine easily and quickly for chamfering any one of the gears. Such means are illustrated in Fig. 12 and 13 with reference to block 104. The block 104 is made of proper size and is provided with holes 125 for locating pins 123 and 124 installed in the bearing frame 103 and the housing 100. The holes 125 are so spaced that when the block 104 is in place, the cutter spindle is automatically brought into the proper position for chamfering that particular gear. Similar means are also provided at block 100 for the gear spindle. One actual machine constructed in accordance with the present invention has been adapted in the above manner to chamfer four different hypoid gears, and has been provided with four locating blocks 104 and 110 of proper sizes and with properly spaced holes, and proper change gears 91 and 92.

Feeding means adapted to bring the gear into the cutting engagement with the cutter 71 and to withdraw the chamfered gear to the unloading position are exemplified by a hydraulic cylinder 111 and a plunger 112 sliding within the housing 106 and carrying the work spindle 85. A stop block 113 of proper size for the gear chamfered secured on the spindle 85 serves for automatically stopping the gear at the extreme positions of its feeding stroke determined by the recess in the frame 114 forming a portion of the housing 106. Hydraulic lines 115 and 116 are provided for operating the feed means and are connected to a suitable source (not shown) of hydraulic pressure. A tooth locator 117 is provided to lock the gear to the work spindle 85.

A chip pan 118 and service doors 119 and 120 are provided. The speed ratio gears 91 and 92, as well as the idler gear 93 are arranged within the change gear box 121 having a detachable cover 122 and, while being properly covered, are thus made easily accessible.

Hydraulic means described above may be substituted by pneumatic means, if desired.

After a gear is located on spindle, the operator presses a button which causes both spindles to rotate, work spindle to feed to stop, and return after the teeth have been chamfered at which time both spindles stop.

Due to this automatic cycle four hypoid gears are chamfered in approximately one minute.

While the method embodying the present invention has been described as chamfering gears after their teeth are first cut, it will be understood that with the use of machines having positive driving connection between the work (gear) spindle and the cutter spindle, the gear blank may be first pre-chamfered, and the gear teeth cut afterwards, by placing such pre-chamfered blank (properly located) into a gear cutting machine. Such pre-chamfering may be very heavy and, in fact, it may constitute substantial roughing out of the teeth, except for taking care of varying depth of the gear teeth. The gear teeth are then finally cut on a finishing machine. By virtue of the above method, under certain conditions the gear may be finally cut in two machines instead of three (roughing out, finally cutting teeth, and chamfering).

By virtue of the above described methods and apparatus for carrying it out, the objects of the invention listed above and numerous additional advantages are attained.

I claim:

1. In a machine for chamfering top edges of teeth on spiral bevel and hypoid gears, a spindle adapted to receive for free rotation thereon a gear to be chamfered, a rotatable cutter having a plurality of chamfering teeth provided thereon, each of said teeth having two cutting lips adapted to chamfer simultaneously two gear tooth edges, said cutter being rotatably mounted in said machine to have its axis extending generally perpendicular to the cone surface of the gear but angularly offset therefrom for an angle to have the plane of cutter rotation coinciding in part with the surface of the gear cone when the gear is brought into chamfering engagement with said cutter, the teeth of the cutter being arranged to mesh with the teeth of the gear one cutter tooth with one gear tooth and to rotate said gear when the cutter is rotated, and means adapted to bring said gear and said cutter into chamfering engagement.

2. The construction defined in claim 1, means bringing the gear and the cutter into chamfering engagement being adapted to move the gear toward the cutter, and an adjustable stop for said means.

3. In a machine for chamfering top edges of teeth on spiral bevel and hypoid gears, a spindle adapted to receive thereon a gear to be chamfered, locating means restraining the gear from rotation relatively to the spindle, a rotatable cutter having a plurality of chamfering teeth provided thereon and rotatably mounted in the machine with its axis extending generally perpendicular to the surface of the gear cone, the teeth of the cutter being arranged to mesh with the teeth of the gear one cutter tooth with one gear tooth and to operate therewith without interference when the cutter is rotated, and driving means positively connecting for rotation said gear spindle and said cutter in the same direction and at a ratio of angular speeds equal to their teeth ratio, each tooth of said cutter being adapted to chamfer simultaneously two immediately adjacent tooth edges of the gear.

4. The construction defined in claim 3, with the driving means connecting said gear spindle and said cutter comprising two gears having the same teeth ratio as the gear and the cutter.

5. The construction defined in claim 3, and including means to adjust the angular and axial offset position of both the gear spindle and the cutter with respect to each other.

6. In a machine for chamfering top edges of teeth on spiral bevel and hypoid gears, a work spindle adapted to receive thereon for rotation a gear to be chamfered, locating means on said spindle for locating the gear in a predetermined position, a rotatable cutter having a plurality of chamfering teeth provided thereon and rotatably mounted in the machine to have its axis extend generally perpendicular to the surface of the gear cone but angularly and axially offset from true perpendicular position to have the cutter teeth rotate parallel to the top edges of the gear teeth engaged thereby, the teeth of the cutter being arranged to mesh with the teeth of the gear one cutter tooth with one gear tooth and to operate therewith without interference when the cutter is rotated, each of said cutter teeh being recessed to straddle a gear tooth and chamfer two edges simultaneously, means positively connecting said gear spindle and said cutter for rotation in the same direction and at a ratio of respective angular speeds equal to the teeth ratio on said gear and said cutter.

7. The construction defined in claim 6 and including common power driving means for said cutter and said gear spindle.

8. The construction defined in claim 6 and including means for adjusting relative angular offset of said gear spindle and said cutter.

9. The construction defined in claim 6 and including means for adjusting relative axial offset of said gear spindle and of said cutter.

10. In a machine for chamfering top edges of teeth on spiral bevel and hypoid gears, a spindle adapted to receive for rotation a gear to be chamfered, a rotatable cutter having a plurality of chamfering teeth provided thereon, each of said teeth having flat sides and two cutting lips adapted to chamfer simultaneously two gear tooth edges, said cutter being rotatably mounted in said machine to have its axis extending generally perpendicular to the cone surface of the gear, but angularly offset therefrom for an angle to have the plane of cutter rotation coinciding in part with the surface of the gear cone when the gear is brought into chamfering engagement with said cutter, the teeth of the cutter being arranged to mesh with the teeth of the gear tooth per tooth, and means adapted to bring said gear and said cutter into chamfering engagement, rotation of both the cutter and the work gear during chamfering operation being in the same direction.

11. In a machine for chamfering top edges of teeth on spiral bevel and hypoid gears, a spindle adapted to receive for rotation a gear to be chamfered, a rotatable cutter having a plurality of chamfering teeth provided thereon, each of said teeth having flat sides and two cutting lips adapted to chamfer simultaneously two gear tooth edges, said cutter being rotatably mounted in said machine to have its axis extending generally perpendicular to the cone surface of the gear but angularly offset therefrom for an angle to have the plane of cutter rotation coinciding in part with the surface of the gear cone when the gear is brought into chamfering engagement with said cutter, the teeth of the cutter being arranged to mesh with the teeth of the gear tooth per tooth, and means adapted to bring said gear and said cutter into chamfering engagement, the diameter of the cutter and position of its axis with respect to the axis of the work gear being selected to produce during chamfering operation rotation of both the cutter and the work gear in the same direction.

References Cited in the file of this patent

UNITED STATES PATENTS

| | | |
|---|---|---|
| 1,168,402 | Lees | Jan. 18, 1916 |
| 1,219,481 | Peterson et al. | Mar. 20, 1917 |
| 1,578,589 | Earl | Mar. 30, 1926 |
| 1,969,843 | Head | Aug. 14, 1934 |
| 2,206,450 | Christman | July 2, 1940 |
| 2,248,168 | Gleason | July 8, 1941 |
| 2,285,133 | Wildhaber | June 2, 1942 |
| 2,316,676 | Drummond | Apr. 13, 1943 |
| 2,354,181 | Carlsen et al. | July 25, 1944 |
| 2,433,201 | Cross | Dec. 23, 1947 |
| 2,443,089 | Wildhaber | June 8, 1948 |